US009832979B2

(12) United States Patent
Kabiling, Jr. et al.

(10) Patent No.: US 9,832,979 B2
(45) Date of Patent: Dec. 5, 2017

(54) ARTIFICIAL REEF SYSTEM

(71) Applicants: Richard E. Lim, Hackensack, NJ (US); Alejandro A Kabiling, Jr., Ave Maria, FL (US)

(72) Inventors: Alejandro A Kabiling, Jr., Ave Maria, FL (US); Richard E Lim, Hackensack, NJ (US); Benjamin A Tayag, Jr., Makati (PH)

(73) Assignees: Richard E. Lim, Hackensack, NJ (US); Alejandro A. Kabiling, Jr., Ave Maria, FL (US)

( * ) Notice: Subject to any disclaimer, the term of this patent is extended or adjusted under 35 U.S.C. 154(b) by 0 days.

(21) Appl. No.: 14/412,893

(22) PCT Filed: May 29, 2013

(86) PCT No.: PCT/US2013/043096
§ 371 (c)(1),
(2) Date: Jan. 5, 2015

(87) PCT Pub. No.: WO2014/007926
PCT Pub. Date: Jan. 9, 2014

(65) Prior Publication Data
US 2015/0189861 A1 Jul. 9, 2015

(30) Foreign Application Priority Data
Jul. 20, 2012 (PH) .............................. 1-2012-000196

(51) Int. Cl.
A01K 61/00 (2017.01)
A01K 61/70 (2017.01)
E02B 3/04 (2006.01)
E02B 3/12 (2006.01)

(52) U.S. Cl.
CPC ............... *A01K 61/70* (2017.01); *E02B 3/04* (2013.01); *E02B 3/046* (2013.01); *E02B 3/12* (2013.01)

(58) Field of Classification Search
CPC ........ A01K 61/006; A01K 61/70; E02B 3/12; E02B 3/04; E02B 3/046
USPC ................................................ 119/221, 207
See application file for complete search history.

(56) References Cited

U.S. PATENT DOCUMENTS

| 4,508,057 | A | * | 4/1985 | Suzuki | A01K 61/006 |
| | | | | | 119/205 |
| 5,215,406 | A | * | 6/1993 | Hudson | E02B 3/046 |
| | | | | | 119/221 |
| 6,382,874 | B1 | * | 5/2002 | Hoashi | A01K 61/70 |
| | | | | | 119/221 |
| 6,431,792 | B1 | * | 8/2002 | Barnes | E02B 3/046 |
| | | | | | 405/25 |
| 6,451,722 | B1 | | 9/2002 | Kim | |
| 7,285,238 | B2 | * | 10/2007 | Buchenroth, III | E02B 3/046 |
| | | | | | 249/127 |
| 7,828,493 | B1 | * | 11/2010 | Brignac | A01K 61/70 |
| | | | | | 119/221 |
| 8,312,843 | B2 | * | 11/2012 | Ortego | A01K 61/002 |
| | | | | | 119/210 |
| 8,398,828 | B1 | | 3/2013 | Winkie et al. | |
| 2005/0238431 | A1 | * | 10/2005 | Buchenroth, III | E02B 3/046 |
| | | | | | 405/25 |
| 2007/0107663 | A1 | * | 5/2007 | Ortego | A01K 61/002 |
| | | | | | 119/237 |
| 2008/0289276 | A1 | * | 11/2008 | Raponi | C04B 16/12 |
| | | | | | 52/294 |
| 2009/0169894 | A1 | | 7/2009 | Buri et al. | |
| 2013/0118413 | A1 | * | 5/2013 | Bennett | A01K 61/006 |
| | | | | | 119/200 |

FOREIGN PATENT DOCUMENTS

| JP | 04-121131 A | 4/1992 |
| KR | 20090060219 A | 11/2009 |
| KR | 20110079955 A | 7/2011 |
| WO | 9936596 A2 | 7/1999 |

OTHER PUBLICATIONS

Loftus et al., "Artificial Reef Management Program for Maryland", published Jun. 2007, 154 pages.
Australian Notice of Acceptance for related Australian Patent Application No. 2013287151 dated Jul. 28, 2017, 3 Pages.

* cited by examiner

*Primary Examiner* — Daniel J Troy
*Assistant Examiner* — Hiwot Tefera
(74) *Attorney, Agent, or Firm* — Ditthavong & Steiner, P.C.

(57) ABSTRACT

Disclosed is an artificial reef molded from a mixture of environmentally friendly homogenized organic and inorganic materials, cement, and 5 aggregates of sand and gravel to form thereon an artificial reef such as reef buds, reef plates, reef honeycombs and other reef structures.

10 Claims, No Drawings

ARTIFICIAL REEF SYSTEM

CROSS-REFERENCES

This application claims the benefit, under 35 U.S.C. §119(a), of Philippine Patent Application Serial No. 1-2012-000196 by Benjamin A. Tayag, Jr., entitled "Artificial Reef System," filed on Jul. 4, 2012, which is incorporated herein in its entirety by this reference.

FIELD OF THE INVENTION

This invention relates in general to artificial reefs which can be deposited on the ocean floor for permitting or enhancing growth of coral and other marine growth thereon but more particularly to an artificial reef system utilizing a mixture of environmentally friendly organic and inorganic components blended together for use as basic material for the production of the reef such as reef buds, reef plate, reef honeycomb, and other components. The components can also be used for underwater erosion control structures and coastal embankment stabilization.

BACKGROUND OF THE INVENTION

The sea is a vital source of life yet often time's man endangers the ability of the sea to continue giving life. That is why many coastal areas once teeming with fish and other marine life are now dead areas due to irresponsible activities of man like dynamite fishing, cyanide fishing, and indiscriminate dumping of industrial wastes and other garbage.

The effect of these activities has led to the significant destruction and reduction of our natural reef systems. All reefs, both natural and artificial, serve as food, shelter and protection for a multitude of marine animals and plants, including vital links in the food chain such as crustaceans, sponges, and invertebrates. Because natural reefs cannot rebuild themselves fast enough to keep up with their destruction rates, the fragile ocean reef system stands in peril.

Since large natural coral structures take thousands of years to develop, one way that man can help the reef system is to put back the essential structure that sustains life. Much like forests replanted on land, artificial reefs must be "planted" on the ocean floor. Efforts have been made to build marine sanctuaries and artificial reefs out of many things such as car tires, construction rubble, ships and planes. Even refuse unsuitable for landfills has been used to make reefs. Unfortunately, many of these methods and systems have turned out to be environmentally unsound, very expensive, or both.

In the case of standard all concrete reefs, such reefs require an excessive amount of time marine life to latch on and germinate on them to result in viable reef structures.

Attempts have been also been made to use all-organic reef materials such as weighted-down logs, ropes, or bamboo. However, these materials do not generate permanent structures which are the basic foundations of a marine ecosystem. Rather, these organic materials merely serve as fish accumulators, attracting them from somewhere else.

Therefore, there is a need to develop an improved artificial reef system that is durable, can support the biota of a naturally-occurring reef system, and does not create additional environmental damage.

SUMMARY OF THE INVENTION

An artificial reef system utilizing a mixture of organic and inorganic components blended together for use as a basic material for the production of reef buds, reef plate, reef honeycomb, and boulder-like materials meets the needs described above. The applications of the product mixture are then used to mold structures such as reef buds, reef plate, reef honeycomb, boulder-like materials, and other structures that form part of a reef.

Reef buds are used for marine life and underwater fauna and flora regeneration, seafloor rehabilitation, silt and slick immobilization, rehabilitation of water body and large surface application. Reef plates are used for silt and slick immobilization, especially when contaminated and environmentally insecure, and for basic underwater farming of sea grass and algae growth. Reef honeycomb is used as a sea barrier, for under- and over-water embankment protection, current control installations, as a front barrier for land reclamations at sea and preventive shoreline rehabilitation and protection. Boulder-like materials are used for land restoration and reclamation.

Thus, it is an object of the present invention to provide an artificial reef system utilizing a mixture of environmentally friendly organic and inorganic components that ensure porosity, capillarity, calcification, and stability of the material to guarantee for a long period the water absorbency in and through the finished product, notwithstanding the speed of growth of marine life in and around the artificial reef system.

Another object is to provide an artificial reef system utilizing a mixture of environmentally friendly organic and inorganic components adaptable to different depths and areas with different pH values at the sea floor, such that the material will have always the same pH as the surrounding water.

Still another object is to provide an artificial reef system utilizing a mixture of environmentally friendly organic and inorganic components that function further as an incubator of plant growth and provide nutrition to plants such that the resulting plant growth acts as one of the activators of ongoing structural change in the artificial reef system itself over a period of time.

Still another object is to provide an artificial reef system utilizing a mixture of environmentally friendly organic and inorganic components that serves as a basic support and anchor for root growth and allows new growth of marine flora and fauna to anchor to the roots more easily and with greater strength in the product surface, thus providing greater resistance against possible strong currents and water turbulence.

Yet another object of the invention is to provide an artificial reef system utilizing a mixture of environmentally friendly organic and inorganic components that is economical and can be formed and molded into any shape and form desired, with no steel reinforcement needed.

Accordingly, one aspect of the present invention is an artificial reef comprising:

(1) environmentally-friendly homogenized organic and inorganic materials;
(2) cement; and
(3) sand and gravel aggregates;

wherein the organic materials, the cement, and sand and gravel aggregates are molded to form the artificial reef.

Typically, the environmentally-friendly homogenized organic and inorganic materials comprise from about 40% to about 60% of organic materials.

In one alternative, the organic materials are selected from the group consisting of: (a) coconut peat, shredded mixed coconut fibers, copra residuals, shredded coconut tree trunks and leaves; (b) sugar cane bagasse; (c) wood industry residuals; (d) paper industry residuals; (e) shredded plants and plant parts; and (f) peat moss or derivatives thereof. When the organic materials include wood industry residuals, the wood industry residuals can be selected from the group consisting of wood chips, wood dust, wood shavings, shredded leaves, trunks, twigs, and bark. When the organic materials include paper industry residuals, the paper industry residuals can be selected from the group consisting of wood pulp, other residuals from paper manufacture, and post-consumer paper discards.

Typically, the environmentally-friendly homogenized organic and inorganic materials comprise from about 40% to about 60% of inorganic materials.

In one alternative, the inorganic materials are selected from the group consisting of: (a) pulverized or ground dolomite-like limestone (apog); (b) chalk, gypsum, or bentonite; (c) cinderized natural zeolite-like ash additives, recovered from volcanic activity and refined prior to use; (d) perlite or its derivatives; (e) sulfonated kalsomine; and (f) a mixture of metal oxides wherein the metal is not a heavy metal, wherein the mixture of the metal oxides comprises about 0.5% of the volume.

When a mixture of metal oxides is included, typically the mixture of metal oxides generates an electrostatic field having a battery effect to enhance the attraction of marine life. Typically, the electrostatic field is between about 0.5 volts and 1.5 volts direct current.

The artificial reef can be in a form selected from the group consisting of a reef bud, a reef plate, and a reef honeycomb; the artificial reef can include steel reinforcement.

The reef can comprise about 50 kilograms of the environmentally-friendly homogenized organic and inorganic materials, about 40 kilograms of cement, and about 300 kilos of sand and gravel with the ratio of 4 bags of sand to 1 bag of gravel.

In another alternative, the reef can comprise about 200 kilograms of the environmentally-friendly homogenized organic and inorganic materials mixed with about 25 to about 30 kilograms of cement.

DETAILED DESCRIPTION OF THE INVENTION

The present invention is a mixture of environmentally-friendly organic and inorganic components blended together for use as basic material for the production of an artificial reef structure or the components thereof, such as reef plate, reef buds, reef honeycomb, or other components of a reef structure, adapted for enhancing marine life habitat.

The components include:

(1) Organic components that serve as fibrous organic materials having both slow degrading and fast degrading characteristics. These comprise 40% to 60% of the homogenized volume. These organic materials are sourced from agricultural industry, the lumber and wood industry, the food industry, or other appropriate commercial sources. Examples of these materials include, but are not necessarily limited to: (a) coconut peat, shredded mixed coconut fibers, copra residuals, shredded coconut tree trunks and leaves; (b) sugar cane bagasse; (c) wood industry residuals such as wood chips, wood dust, wood shavings, shredded leaves, trunks, twigs, and bark; (d) paper industry residuals such as wood pulp, other residuals from paper manufacture, and post-consumer paper discards; (e) shredded plants and plant parts including those found in waterways such as water lilies, mangroves, algae, and other plants and plant components; and (f) peat moss or derivatives thereof.

These organic components ensure the capillarity and porosity of the homogenized material to guarantee for a long period of time the water absorbency in and through the finished product (estimated minimum penetration time of 14 hours). After placement of the product in different depths and areas with different pH values at the sea floor, the product will always have substantially the same pH as the water surrounding the product. This will assist attachment and growth of biota to the product, as animals and plants will not have to adjust to a pH difference.

The organic components function further as an incubator of plant growth and assist in providing nutrition. The organic components also function as one of the activators of the ongoing structural changes of the product itself over a period of time. The stored humidity associated with the organic particles and also associated with particles absorbed to the structure will be the catalyst for several ongoing chemical reactions. Furthermore, these organic components are also the basic support and anchor for the root growths and allow new growing marine fauna and flora to anchor with their roots in or on the product surface and thereby result in greater resistance against possible strong currents or underwater turbulence.

(2) Inorganic components that serve as calcification agents that comprise 40% to 60% of homogenized volume. These inorganic components include, but are not necessarily limited to: (a) pulverized or ground dolomite-like limestone (apog); (b) chalk, gypsum, or bentonite; (c) cinderized natural zeolite-like ash additives, recovered from volcanic activity and refined prior to use; (d) perlite or its derivatives; (e) sulfonated kalsomine; and (f) a mixture of metal oxides wherein the metal is not a heavy metal, wherein the mixture of the metal oxides comprises about 0.5% of the volume.

These inorganic components secure a rapid reaction of the product with seawater and start an activated calcification process. At the same time, the inorganic components react with each other and with contaminants in the surrounding seawater, such as urine/ammoniac, detergents, and surfactants (nitrates, sulfates, and sulfides) as a form of absorbent and neutralization agent. At the beginning, the absorbed nitrates will support and positively influence the calcification reaction of the product.

One of the positive aspects of this reaction in combination with the use of organic materials described above is the oxygen and nitrogen production of the product, which supports the rapid establishment of marine life in association with the product. The presence of metal oxides will generate a battery effect and thus generate an electrostatic field of between about 0.5 and 1.5 volt direct current. The generated electrostatic field will further enhance the attraction of marine life to the product. This is known as coral cloning, which has the advantage that it can be applied to a large generated surface.

Activated calcification of the product will guarantee a natural, fertile and compatible habitat for marine life and after a short while will be overgrown and remain as a fully hard and stable coral reef foundation. Eventually it will be a shelter and breeding place for marine life during their breeding and spawning periods.

The reaction and effects, supported by the new growth of underwater fauna and flora, in combination with the marine life habitation will be a suitable solution to rehabilitate and reactivate affected areas/dead reefs and imbalanced bodies of water.

The mixture of organic and inorganic components comprised of homogenized volume are mixed with cement as binder and sand and gravel aggregates. This will be formed or molded to produce a product such as reef buds, reef plates, reef honeycombs, boulder-like materials, and other components of artificial reefs with or without steel reinforcement.

In a preferred alternative, a reef composition comprises about 50 kilos of the mixture of organic and inorganic components, about 40 kilos of cement, and about 300 kilos of sand and gravel with the ratio of 4 bags of sand to 1 bag of gravel. In another alternative, the reef composition can be about 200 kilograms of the mixture of organic and inorganic components mixed with about 25 to about 30 kilograms of cement.

ADVANTAGES OF THE INVENTION

The present invention provides an effective and environmentally safe artificial reef that functions to restore reefs in areas where reefs have declined, particularly due to the destructive effects of human activity. The artificial reef of the present invention can be constructed from readily available materials and utilizes waste material, thus reducing the need to dispose of waste products such as those from wood harvesting and paper manufacturing in a way that can increase pollution.

The artificial reef and other products of the present invention possess industrial utility as products of manufacture suitable for use for environmental remediation.

With respect to ranges of values, the invention encompasses each intervening value between the upper and lower limits of the range to at least a tenth of the lower limit's unit, unless the context clearly indicates otherwise. Moreover, the invention encompasses any other stated intervening values and ranges including either or both of the upper and lower limits of the range, unless specifically excluded from the stated range.

Unless defined otherwise, the meanings of all technical and scientific terms used herein are those commonly understood by one of ordinary skill in the art to which this invention belongs. One of ordinary skill in the art will also appreciate that any methods and materials similar or equivalent to those described herein can also be used to practice or test this invention.

The publications and patents discussed herein are provided solely for their disclosure prior to the filing date of the present application. Nothing herein is to be construed as an admission that the present invention is not entitled to antedate such publication by virtue of prior invention. Further the dates of publication provided may be different from the actual publication dates which may need to be independently confirmed.

All the publications cited are incorporated herein by reference in their entireties, including all published patents, patent applications, and literature references, as well as those publications that have been incorporated in those published documents. However, to the extent that any publication incorporated herein by reference refers to information to be published, applicants do not admit that any such information published after the filing date of this application to be prior art.

As used in this specification and in the appended claims, the singular forms include the plural forms. For example the terms "a," "an," and "the" include plural references unless the content clearly dictates otherwise. Additionally, the term "at least" preceding a series of elements is to be understood as referring to every element in the series. The inventions illustratively described herein can suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the future shown and described or any portion thereof, and it is recognized that various modifications are possible within the scope of the invention claimed. Thus, it should be understood that although the present invention has been specifically disclosed by preferred embodiments and optional features, modification and variation of the inventions herein disclosed can be resorted by those skilled in the art, and that such modifications and variations are considered to be within the scope of the inventions disclosed herein. The inventions have been described broadly and generically herein. Each of the narrower species and subgeneric groupings falling within the scope of the generic disclosure also form part of these inventions. This includes the generic description of each invention with a proviso or negative limitation removing any subject matter from the genus, regardless of whether or not the excised materials specifically resided therein. In addition, where features or aspects of an invention are described in terms of the Markush group, those schooled in the art will recognize that the invention is also thereby described in terms of any individual member or subgroup of members of the Markush group. It is also to be understood that the above description is intended to be illustrative and not restrictive. Many embodiments will be apparent to those of in the art upon reviewing the above description. The scope of the invention should therefore, be determined not with reference to the above description, but should instead be determined with reference to the appended claims, along with the full scope of equivalents to which such claims are entitled. Those skilled in the art will recognize, or will be able to ascertain using no more than routine experimentation, many equivalents to the specific embodiments of the invention described. Such equivalents are intended to be encompassed by the following claims.

What is claimed is:

1. An artificial reef comprising:
(a) environmentally-friendly homogenized organic and inorganic materials, wherein the organic materials are selected from the group consisting of: (a) coconut peat, shredded mixed coconut fibers, copra residuals, shredded coconut tree trunks and leaves; (b) sugar cane bagasse; (c) wood industry residuals selected from the group consisting of wood chips, wood dust, wood shavings, shredded leaves, trunks, twigs, and bark; (d) paper industry residuals selected from the group consisting of wood pulp and post-consumer paper discards; (e) shredded plants and plant parts; and (f) peat moss or derivatives thereof;
(b) cement; and
(c) sand and gravel aggregates;
wherein the organic materials, the cement, and sand and gravel aggregates are molded to form the artificial reef,
wherein the environmentally-friendly homogenized organic and inorganic materials comprise from about 40% to about 60% of organic materials, and
wherein the inorganic materials include a mixture of metal oxides wherein the metal is not a heavy metal, wherein the mixture of the metal oxides comprises about 0.5% of the volume.

2. An artificial reef comprising:
(a) environmentally-friendly homogenized organic and inorganic materials;
(b) cement; and
(c) sand and gravel aggregates;
wherein the environmentally-friendly homogenized organic and inorganic materials comprise from about 40% to about 60% of organic materials and from about 40% to about 60% of inorganic materials;
wherein the inorganic materials includes a mixture of metal oxides wherein the metal is not a heavy metal, wherein the mixture of the metal oxides comprises about 0.5% of the volume; and
wherein the organic materials, the cement, and sand and gravel aggregates are molded to form the artificial reef wherein the mixture of metal oxides generates an electrostatic field having a battery effect to enhance the attraction of marine life.

3. The artificial reef of claim 2 wherein the electrostatic field is between about 0.5 volts and 1.5 volts direct current.

4. The artificial reef of claim 2 wherein the artificial reef is in a form selected from the group consisting of a reef bud, a reef plate, and a reef honeycomb.

5. The artificial reef of claim 2 wherein the organic materials include wood industry residuals.

6. The artificial reef of claim 5 wherein the wood industry residuals are selected from the group consisting of wood chips, wood dust, wood shavings, shredded leaves, trunks, twigs, and bark.

7. The artificial reef of claim 2 wherein the organic materials include paper industry residuals selected from the group consisting of wood pulp and post-consumer paper discards.

8. The artificial reef of claim 2 wherein the reef comprises about 50 kilos of the environmentally-friendly homogenized organic and inorganic materials, about 40 kilos of cement, and about 300 kilos of sand and gravel with the ratio of 4 bags of sand to 1 bag of gravel.

9. The artificial reef of claim 2 wherein the reef comprises about 200 kilograms of the environmentally-friendly homogenized organic and inorganic materials mixed with about 25 to about 30 kilograms of cement.

10. The artificial reef of claim 2 wherein the reef includes steel reinforcement.

* * * * *